Jan. 28, 1969  T. N. LINCICOME  3,424,202
DUAL BELLOWS COMPENSATOR
Filed Sept. 8, 1966  Sheet 1 of 2
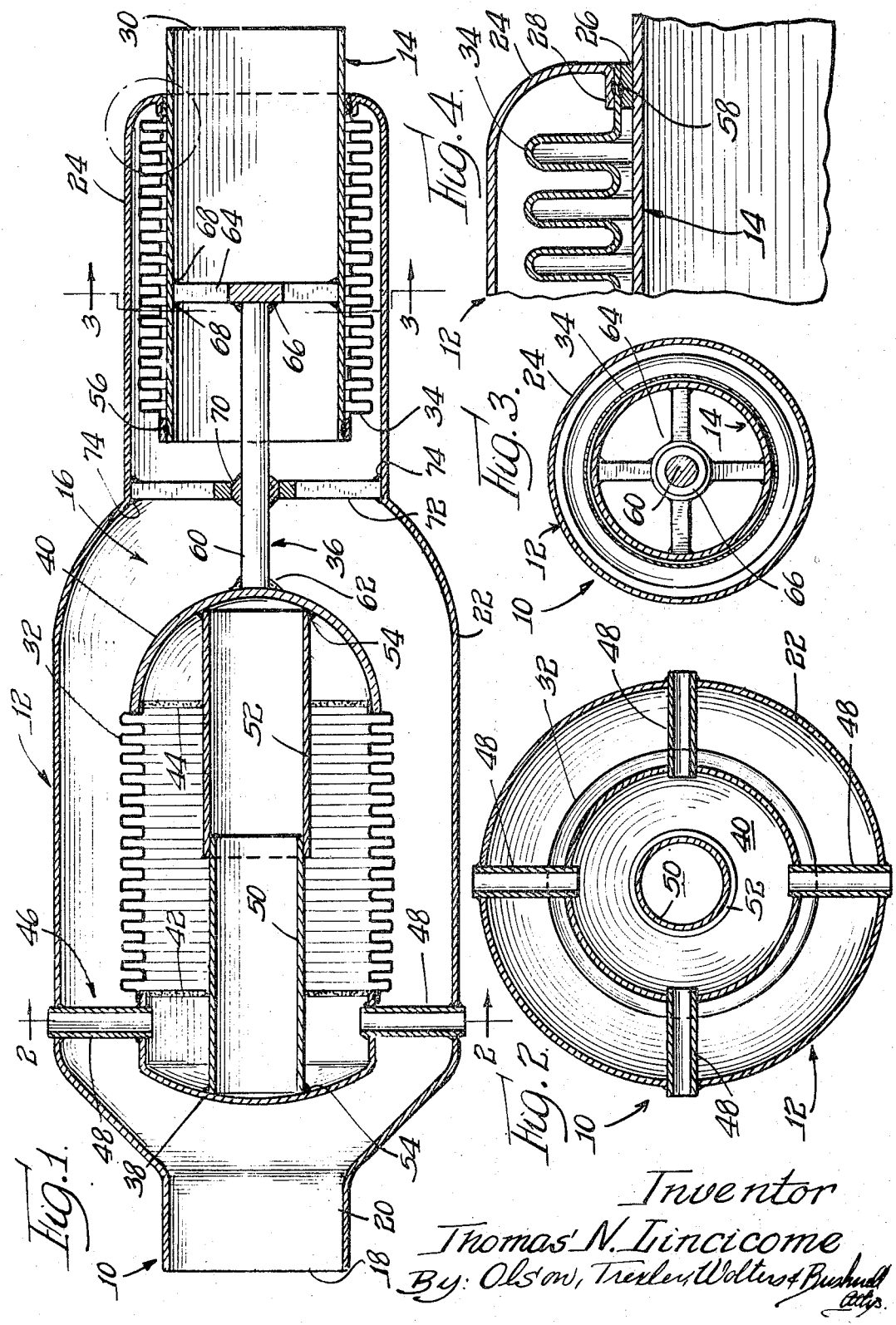
Inventor
Thomas N. Lincicome
By: Olson, Trexler, Wolters & Bushnell
attys.

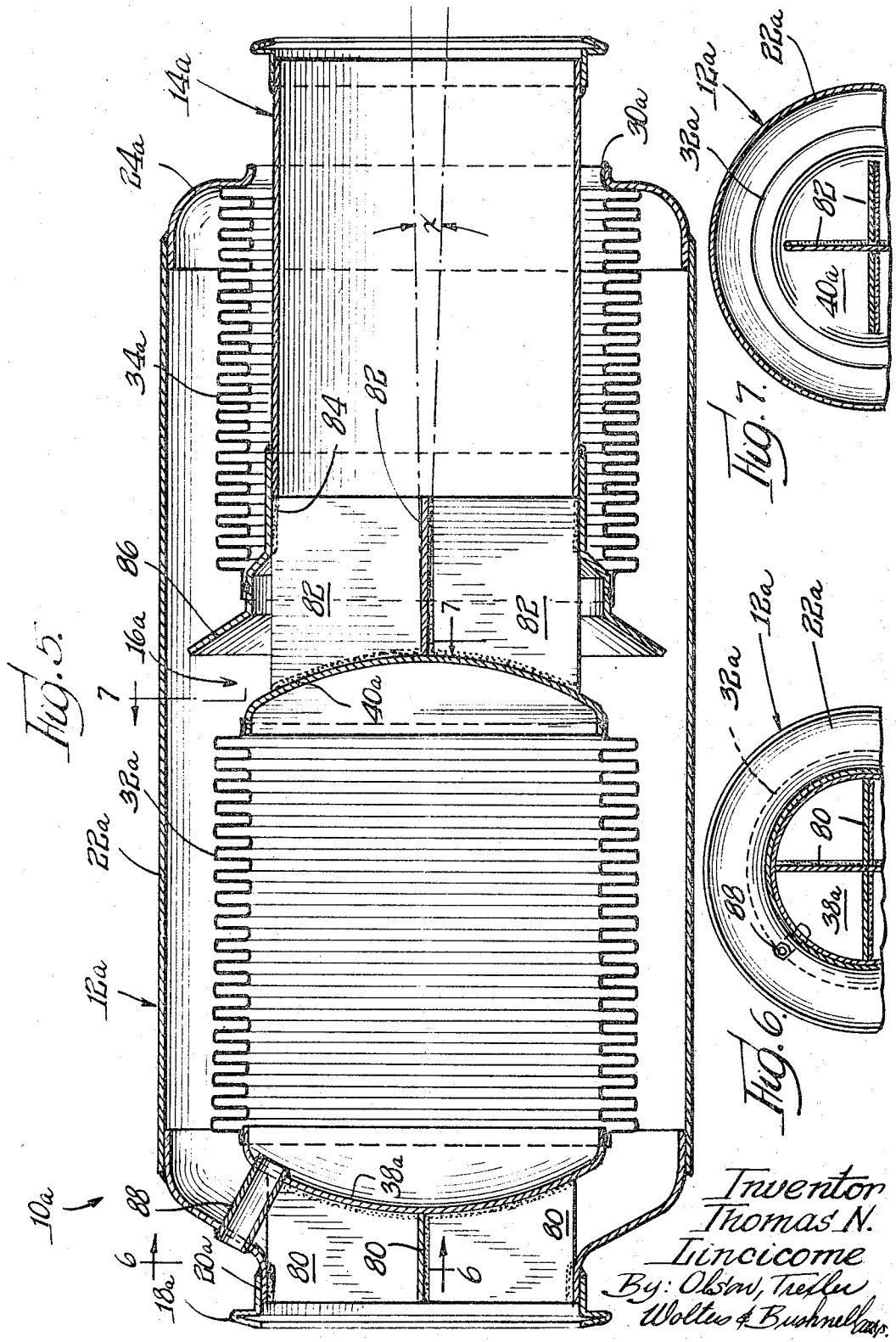

United States Patent Office 3,424,202
Patented Jan. 28, 1969

3,424,202
DUAL BELLOWS COMPENSATOR
Thomas N. Lincicome, Elgin, Ill., assignor to Calumet & Hecla, Inc., Evanston, Ill., a corporation of Michigan
Filed Sept. 8, 1966, Ser. No. 578,023
U.S. Cl. 138—31  9 Claims
Int. Cl. F16l 51/02, 27/12

This invention relates generally to piping system and more particularly to joints employed in piping systems to compensate for changes in temperature and for other conditions tending to elongate or contract the system axially.

Compensators have heretofore been constructed to preserve a constant volume state during changes in the physical conditions of either the piping system or the conveyed fluid. However, these prior art compensators have commonly employed a plurality of mechanically opposed, corrugated metal bellows arranged to bear internally the pressure of the conveyed fluid. These prior art compensators have been limited by the apparent need to provide the bellows with substantial rigidity and to use only rather short bellows. Concomitantly, either the permissive stroke of the bellows or its cycle life has been reduced; and heavier piping with resultant greater support have been required.

The present invention is based on the discovery that externally pressurized bellows, unlike internally pressurized bellows, are not subject to "squirm," a condition that is analogous to column buckling; and correspondingly, an important object of the present invention is to provide a compensator which does not possess the aforesaid limitations of the prior art.

A more general object of the invention is to provide a new and improved compensator of the bellows-type.

Another object of the invention is to provide a compensator in which the component bellows are externally exposed to the conveyed fluid.

Still another object of the invention is to provide a volume compensated, tubular expansion joint that is capable of substantial axial stroke.

Yet another object of the invention is to provide such an expansion joint that is characterized by a long cycle life.

These and other objects and features of the invention will become more apparent from a consideration of the following descriptions.

A compensator in accord with the invention includes a primary fluid carrier and a secondary fluid carrier telescopingly arranged with the primary fluid carrier. In addition, restraining means are disposed inside the primary fluid carrer connected thereto and to the secondary fluid carrier. These restraining means include a plurality of corrugated tubular members and coupling means cooperating to form a rigid connection between the tubular members.

The invention, both as to its construction and its mode of operation, will be better understood by reference to the following disclosure and drawings forming a part thereof, wherein:

FIG. 1 is a longitudinal view in cross-section of a compensator constructed in compliance with the present invention;

FIG. 2 is a transverse cross-sectional view taken substantially along the line 2—2 of FIG. 1;

FIG. 3 is a transverse cross-sectional view taken substantially along the line 3—3 of FIG. 1;

FIG. 4 is an enlarged view of the area enclosed in the broken line circle in the upper right-hand portion of FIG. 1;

FIG. 5 is a longitudinal view in cross-section showing a modified compensator in compliance with the invention;

FIG. 6 is a fragmentary, transverse cross-sectional view taken substantially along the line 6—6 of FIG. 5; and FIG. 7 is a fragmentary, transverse cross-sectional view taken substantially along the line 7—7 of FIG. 5.

Referring now in detail the drawings, specifically to FIGS. 1–3, a compensator indicated generally by the numeral 10 comprises a shroud 12 which defines a primary fluid carrier, a tube 14 which defines a secondary fluid carrier, and a restraining unit 16. Various components of the compensator 10 are advantageously fabricated from suitable metals; and in this latter regard, stainless steels and various nickel alloys have proved eminently useful. The shroud 12 which defines the primary fluid carrier includes an inlet orifice 18 that is defined by a throat portion 20; and the throat portion 20 merges with a radially enlarged mid-portion 22 which, in turn, merges with a terminal portion 24. The secondary fluid carrier that is defined by the tube 14 slides telescopingly into the shroud 12, particularly into the terminal portion 24 thereof; and referring to FIG. 4 for the moment, free motion of the tube 14 relative to the shroud 12 is insured by an annular bearing 26 which is fixed at an in-turned lip 28 of the terminal portion 24. Returning to FIG. 1, that portion of the tube 14 which extends outwardly of the shroud 12 defines an outlet orifice 30 for the compensator 10.

The restraining unit 16 comprises an upstream, corrugated tubular bellows 32, a downstream, corrugated tubular bellows 34, and a coupling arrangement 36 which serves to connect the bellows 32 and 34 rigidly. In order to seal off the interior of bellows 32, spherical end caps 38 and 40 are secured thereto by suitable means such as the annular weldments 42 and 44 respectively. In addition, the bellows 32 is fixed in the mid-portion 22 of shroud 12 by a spider 46; and in the embodiment of FIGS. 1–4, this spider comprises four tubular elements 48 which penetrate the shroud 12 and either the end cap 38 or the neck of bellows 32 in order to vent the interior of the bellows to the surrounding atmosphere. In the embodiment of FIGS. 1–4, axial stroke of the bellows 32 is guided by a pair of telescopingly interfitting tubes 50 and 52 which are secured respectively to the end caps 38 and 40 by means of annular weldments 54.

Like the bellows 32, the bellows 34 is arranged so that its interior is excluded from contact with the fluid passing through the compensator 10. Specifically, the upstream end of bellows 34 is secured to the upstream end of tube 14 by means of an annular weldment 56. The downstream end of bellows 34, on the other hand, is secured, as is shown in FIG. 4, to the in-turned lip 28 of shroud 12 by means of an annular weldment 58. This weldment or other fastening means may be employed in mounting the bearing 26 in place. Venting of the space between bellows 34 and tube 14 is achieved by a loose fitting of the bearing 26 about the exterior surface of the tube 14.

The coupling arrangement 36 includes a cylindrical rod or post 60 which is fastened to end cap 40 by a weldment 62 and to tube 14 by means of a spider 64 which is fastened to the downstream end of rod 60 with a weldment 66, spider 64 being secured to the tube 14 by annular weldments 68. Movement of the rod 60 axially of the compensator 10 is directed by a bearing 70 which is mounted centrally in a spider 72 that is itself fastened to the interior surface of shroud 12 adjacent the juncture of mid-portion 22 and terminal portion 24 by means of annular weldments 74.

Having thus described one construction of the invention, it will be valuable now to set forth the manner in which the described embodiment operates. The com- pensator 10 is intended to be installed in a piping system that is employed in transferring a fluid from one location to another; and advantageously, the compensator 10 will be installed with the throat portion 20 of the shroud 12 connected generally upstream where the spherical surface of end cap 38 may be employed to direct the inlet fluid around the sides of bellows 32 and generally into the annular space between bellows 32 and the radially enlarged mid-portion 22 of the shroud 12. Correspondingly, the tube 14 will be connected to the downstream portion of the piping system. Various forces are capable of producing a tendency for such a piping system to elongate axially, such as for example an increase in the temperature of the transmitted fluid or an increase in the pressure on the fluid. Conversely, decreases in these physical factors produces a tendency for the piping system to contract axially. It is these sorts of actions that the compensator 10 is intended to counteract.

Assuming that the compensator 10 is connected in a piping system as has been described and assuming that the temperature of the transmitted fluid is increased, the tube 14 and the shroud 12 will tend to move relatively apart from each other. However, the restraining unit 16 will act to resist such movement. More specifically, movement of the tube 14 relatively outwardly of the shroud 12 will produce an axial contraction of the bellows 34; but since that bellows is connected to the bellows 32 by means of the coupling arrangement 36, a corresponding increase in the length of bellows 32 will be realized. Lateral or radial restraint of these movements is afforded by the rigidly positioned bearing 70 guiding the movement of the rod 60 and the slidable telescoping interaction of the tubes 50 and 52.

When the bellows 32 and 34 are selected to have the same length, the same number of corrugations, the same internal and external diameters, the same corrugation profile and the same spring rate, each increment of contraction of the bellows 34 is equaled by a corresponding expansion of bellows 32 whereby to preserve a desired, constant volume condition in the contained volume of the compensator 10. Furthermore, it is the external surfaces of the bellows 32 and 34 which are exposed to the transmitted fluid; and it has been observed that the bellows 32 and 34 have no tendency to "squirm" or exhibit incipient buckling. Accordingly, the bellows 32 and 34 are stable with respect to pressure; and as a result, the compensator of the invention is capable of delivering a substantial axial stroke, using relatively flexible bellows, without experiencing any adverse effects on cycle life. Elimination of the propensity for "squirm" also permits the surrounding shrouds to be spaced closely to the bellows, if desired, without incurring relative rubbing of the parts.

It will be recognized that contraction of one of the bellows 32 and 34 will be accompanied by expulsion of air out of the bellows whereas elongation of the bellows will be accompanied by withdrawing of atmospheric air into the bellows. The bellows 32 may be completely sealed, i.e. the venting eliminated, when the compensator is required to provide only small axial stroke, when only small changes in the temperature of the transmitted fluid are to be experienced, and when the pressure on the transmitted fluid is comparatively high.

While a particular embodiment of the invention has been thus far shown and described, it should be understood, of course, that the invention is not limited thereto since many modifications may be made. In order to enhance the understanding of the invention, therefore, one such modification is shown in FIGS. 5–7. Since the embodiment of FIGS. 5–7 includes many elements which are similar to those found in the embodiment of FIGS. 1–4, like numerals are used to denote like parts with the suffix letter "a" being utilized to distinguish those elements associated with the embodiment of FIGS. 5–7.

The compensator 10a of FIGS. 5–7 is distinguished in a number of respects. Principal among these is the ability of the compensator to accommodate axial misalignment of the shroud 12a and the tube 14a. Specifically, the outlet orifice 30a of shroud 12a is generously proportioned to be spaced apart from the tube 14a by a substantial distance. Cooperatively, the restraining unit 16a is constructed to avoid use of axial guide bearings. Furthermore, the support for bellows 32a is oriented to an axial attitude; and in particular, the end cap 38a of bellows 32a is connected to the throat portion 20a of shroud 12a by means of axially extending blades or crossarms 80. Thus, the assembled bellows 32a and 34a may swing in a narrow arc about the pivot defined by end cap 38a. Such action is indicated by the arc "x" in FIG. 5.

In addition, the restraining unit 16a is arranged to comprise axially extending blades are arms 82 which are connected, as by welding, to end cap 40a and to a mounting collar 84 which defines the throat of a funnel member 86. The collar 84 is welded in turn to the tube 14a, and the funnel member 86 serves to lead the fluid entering the shroud 12a into the interior of tube 14a.

Venting of the bellows 32a is achieved by means of an obliquely disposed tube 88.

In other respects, the compensator 10a functions in a similar manner and has advantages like those of the compensator 10.

The specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. A compensator comprising: a primary fluid carrier having a first orifice for passing fluid; a secondary fluid carrier telescopingly arranged with said primary fluid carrier defining a second orifice for passing fluid; and restraining means disposed inside said primary fluid carrier connected thereto and to said secondary fluid carrier, said restraining means including a plurality of corrugated tubular members and coupling means cooperating to form a rigid connection between said tubular members.

2. A compensator according to claim 1 wherein said plurality of tubular members comprises a first and a second corrugated member, said first tubular member being mounted on said primary carrier adjacent said first orifice and having cap means closing the ends thereof, said second tubular member having one end sealingly mounted on said primary carrier and the opposite end sealingly mounted on said secondary carrier, said secondary carrier being telescopingly disposed within said second tubular member, whereby the external surfaces of said members are exposed to the fluid conveyed by said carriers.

3. A compensator according to claim 1 wherein said restraining means includes means sealing the ends of said tubular members and means venting said members externally of said carriers.

4. A compensator according to claim 3 wherein said coupling means comprises a cylindrical element and wherein said restraining means further includes a guide bearing slidably receiving said cylindrical element and mounting means for said bearing secured to one of said carriers to direct movement of said element axially of said one carrier.

5. A compensator according to claim 1 wherein said secondary carrier is spaced apart from an encompassing portion of said primary carrier to accommodate axial misalignment of said carriers.

6. A compensator according to claim 1 wherein said restraining means includes an end cap on one of said tubular members and wherein said coupling means comprises a cylindrical element that is joined to said one tubular member by means including said end cap and that is joined to another of said tubular members by means including said secondary carrier.

7. A compensator according to claim 6 wherein said restraining means further includes means venting said members externally of said carriers.

8. A compensator according to claim 7 wherein said one tubular member is mounted on said primary carrier adjacent said first orifice and has cap means, including said end cap, closing the ends thereof, said other tubular member having one end sealingly mounted on said primary carrier and the opposite end sealingly mounted on said secondary carrier, said secondary carrier being telescopingly disposed within said other tubular member, whereby the external surfaces of said tubular members are exposed to the fluid conveyed by said carriers.

9. A compensator according to claim 1 wherein said coupling means comprises a cylindrical element and wherein restraining means further includes a guide bearing slidably receiving said cylindrical element and mounting for said bearing secured to one of said carriers to direct movement of said element axially of said one carrier.

References Cited

UNITED STATES PATENTS

| 2,415,812 | 2/1947 | Cunningham | 138—31 |
| 3,088,493 | 5/1963 | Baines et al. | 138—31 |
| 3,336,948 | 8/1967 | Lucien | 138—31 |

FOREIGN PATENTS

| 561,694 | 9/1930 | Germany. |

PATRICK D. LAWSON, *Primary Examiner.*